United States Patent
Clerc

(10) Patent No.: US 8,012,386 B2
(45) Date of Patent: Sep. 6, 2011

(54) METHOD OF MANUFACTURING A LENS PRESENTING A GRADED TINT

(75) Inventor: Didier Clerc, Eloise (FR)

(73) Assignee: BNL Eurolens, Bellegarde-sur-Valserine (FR)

( * ) Notice: Subject to any disclaimer, the term of this patent is extended or adjusted under 35 U.S.C. 154(b) by 486 days.

(21) Appl. No.: 12/114,148

(22) Filed: May 2, 2008

(65) Prior Publication Data

US 2008/0277808 A1    Nov. 13, 2008

Related U.S. Application Data

(63) Continuation-in-part of application No. 10/419,790, filed on Apr. 22, 2003, now abandoned.

(30) Foreign Application Priority Data

May 2, 2002  (FR) ..................... 02 05503

(51) Int. Cl.
     *B29D 11/00* (2006.01)
(52) U.S. Cl. .......... 264/1.7; 264/1.32; 264/2.5; 425/808
(58) Field of Classification Search ............. 264/1.1, 264/1.7, 1.32, 2.5; 425/808
     See application file for complete search history.

(56) References Cited

U.S. PATENT DOCUMENTS

| 3,228,696 A | 1/1966 | Hull |
| 4,622,184 A | 11/1986 | Barnhart et al. |
| 5,453,100 A | 9/1995 | Steloff |
| 5,523,030 A | 6/1996 | Kingsbury |
| 5,959,761 A | 9/1999 | Perrott et al. |

FOREIGN PATENT DOCUMENTS

GB     1 163 002     9/1969

*Primary Examiner* — Mathieu D. Vargot
(74) *Attorney, Agent, or Firm* — Young & Thompson

(57) ABSTRACT

A method of manufacturing a lens presenting a graded tint, the lens comprising first and second layers each of which is made of a thermoplastic material, with only one of the layers being colored in the tint concerned, the method including the steps of:
- injecting the thermoplastic material of the first layer into a first mold cavity in order to form the first layer; and
- placing the first layer in a second mold cavity and injecting therein the thermoplastic material of the second layer so as to form the second layer on the first layer.

7 Claims, 1 Drawing Sheet

METHOD OF MANUFACTURING A LENS PRESENTING A GRADED TINT

BACKGROUND OF THE INVENTION

1. Field of the Invention

The present invention relates to a method of manufacturing a lens presenting a graded tint, the lens being suitable for use in making spectacles. The term "lens" is used to cover any optical element that is for fitting to spectacles or the like and regardless of whether it performs any correcting function.

2. Description of the Related Art

Lenses exist which present tint that is graded, i.e. tint of intensity that varies generally from the top edge of the lens towards the bottom edge of the lens. The intensity of the tint is strongest close to the top edge of the lens in the zone of the lens that is most usually struck directly by the sun's rays, while the intensity of the tint is weaker close to the bottom edge of the lens so as to minimize its influence on the user's vision.

It is known to make such lenses by associating a first layer of thermoplastic material that is tinted with a second layer of thermoplastic material that is not tinted, the layers having thicknesses that vary in substantially complementary manner. This makes it possible to make sunglasses, sunscreens, tinted vision-correcting spectacles having a single focus, tinted correction lenses having progressively-varying focus, and all presenting tint that is graded.

BRIEF SUMMARY OF THE INVENTION

The invention seeks to propose a low cost and reliable method for manufacturing a lens of this type.

The invention thus provides a method of manufacturing a lens presenting a graded tint, the lens comprising first and second layers each of which is made of a thermoplastic material, with only one of the layers being colored in the tint concerned.

According to the invention, the method comprises the step of:

injecting the thermoplastic material of the first layer into a first mold cavity in order to form the first layer, wherein:
the first layer is the layer colored in the tint concerned and occupies a front face of a lens,
said first layer being of varying thickness along a vertical direction and presenting on the top edge a thickness which is at least superior or equal to 1.5 mm and on the bottom edge a thickness which is at least inferior or equal to 0.8 mm;
said variation of the thickness of the first layer from the top to the bottom of the lens providing a graded vertical tinting effect to the lens, which presents the great variation of transmission (Tv), along a vertical direction, into a space comprised from 20 to 25 mm above and below the geometric centre of said lens along a horizontal direction,
said first layer being of constant thickness as measured along a horizontal direction to provide along this horizontal direction a constant horizontal tinting effect to the lens; and
placing the first layer in a second mold cavity and injecting therein the thermoplastic of the second layer so as to form the second layer on the first layer,
the second layer occupying a rear face of the lens,
said second layer being of varying thickness along a vertical direction from a top edge of the lens to a bottom edge of the lens, in a substantially complementary manner with the first layer to provide a lens which presents on the top edge and on the bottom edge a thickness at least superior to 1.5 mm said second layer being of varying thickness as measured along a horizontal direction to provide the optical property to the lens.

Thus, the two layers are intimately bonded in a manner that is simple and easily reproducible. With this method, it is possible to obtain lenses of particularly good optical quality, thus making it possible in particular to restrict or even eliminate any risk of optical deflection between the layers and to obtain long production runs of lenses that present stable tints.

In a particular implementation, the first layer is the layer colored with the corresponding tint while the second layer is preferably non-tinted.

Thus, the second layer can be shaped to form a correcting lens without spoiling the grading of the tint.

BRIEF DESCRIPTION OF THE DRAWING FIGURES

Other characteristics and advantages of the invention appear on reading the following description of a particular, non-limiting implementation of the invention.

Reference is made to the accompanying drawing, in which.

DETAILED DESCRIPTION

Figure 1:
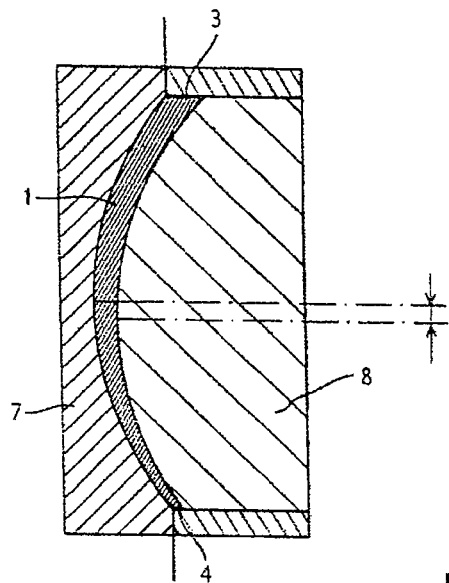
FIG. 1 is a diagrammatic view showing the step of molding the first layer of the lens.
Figure 2:
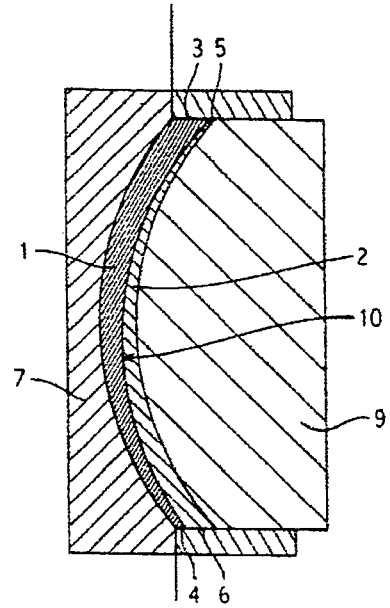
FIG. 2 is a diagrammatic view showing the step of molding the second layer of the lens and FIG. 3 is a is a face view of the lens obtained by the method of the invention

With reference to the figures, the method of the invention serves to make a lens possessing tint that presents grading and that is for fitting to a pair of spectacles.

The lens comprises a layer 1 and a layer 2. The layer 1 is intended in this case to occupy the front face of the pair of spectacles, and it is colored with the tint concerned, while the layer 2 is not tinted, which layer 2 is thus intended in this case to occupy the rear face of the pair of spectacles. The layers 1 and 2 are of thicknesses that vary in substantially complementary manner going from their top edges towards their bottom edges in such a manner that the lens is of constant thickness in said direction so as to enable the lens to present relatively good optical quality, satisfying the optical standards that are in force. More precisely, the thickness of the layer 1 decreases going from its top edge 3 towards its bottom edge 4, while the thickness of the layer 2 increases going from its top edge 5 to its bottom edge 6. The thicknesses may vary in linear or non-linear manner in order to cause the graded effect to be accentuated or attenuated locally.

In a preferred embodiment of the invention, the thickness of the layer 1 decreases going from its top edge 3 towards its bottom edge 4, in a manner that the thickness on the top edge 3 is at least superior or equal to about 1.5 mm (millimetre), and preferentially is comprised between about 1.5 mm to 2.0 mm, and the thickness on the bottom edge is at least inferior or equal to 0.8 mm, and preferentially is comprised between about 0.8 mm and 0.5 mm. These specific parameters related to the thickness of the first lens provide the best cosmetic quality and permit to preserve the optical quality of said lens. More particularly, the graded vertical tinting effect to the lens, created through the variation of the thickness of said first layer from the top edge to the bottom edge of the lens, presents the great variation of transmission (Tv), along a vertical direction, into a space comprised from about 20 to 25 mm above and below the geometric centre (C) of said lens along a horizontal direction. This characteristic is illustrated by FIG.

Figure 3:
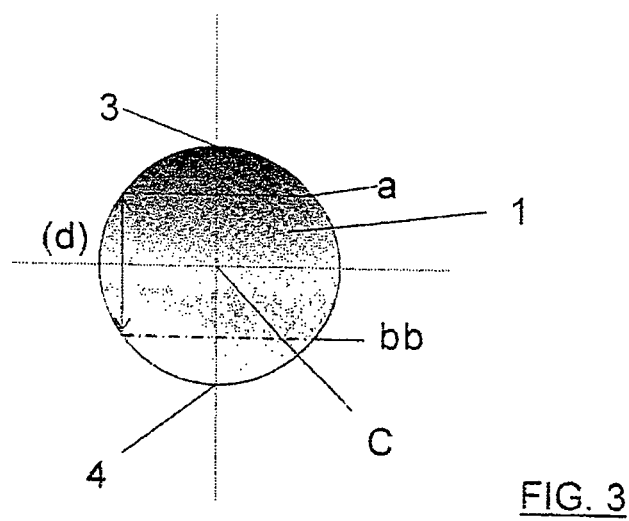

3, which represents a face view of a lens obtained by the method of the invention. In this FIG. 3 a lens with a diameter of 60 mm for example, is represented, wherein the lines (a) and (b) which extend along a horizontal direction and to a distance (d), along a vertical direction, comprised from about 20 to 25 mm respectively above and below the geometric centre (C). The graded vertical tinting effect of the lens into the space corresponding to the distance (d) presents the major variation of transmission, which guarantees to the wearer the best solar protection and the best visual comfort. In the same time the first layer is of constant thickness as measured along a horizontal direction to provide along this horizontal direction a constant horizontal tinting effect to the lens.

The method of the invention is implemented using an injection molding installation comprising a concave mold shape 7 and two convex mold shapes 8 and 9.

Initially, the concave shape 7 is placed facing the convex shape 8 so as to define a mold cavity for the layer 1 of the lens. The shapes 7 and 8 are arranged in such a manner that the layer 1 has a thickness that decreases going from its top edge 3 towards its bottom edge 4 and that the shapes 7 and 8 in this case have their respective axes offset from each other. It is also possible for the axes of the shapes 7 and 8 not to be offset.

A colored thermoplastic material for forming the layer 1 is then injected while soft into the cavity formed by the shapes 7 and 8. The intensity of the tint of the layer 1 decreases going from its top edge 3 to its bottom edge 4 because of the decrease in the thickness of the layer 1 in this direction.

Once the thermoplastic material has set, the shapes 7 and 8 are spaced apart from each other. The concave shape 7 is arranged in such a manner that the layer 1 remains in position in the concave shape 7.

Thereafter, the concave shape 7 is caused to face the convex shape 9 in such a manner that the concave face 10 of the layer 1 co-operates with the convex shape 9 to define a cavity for forming the layer 2. The concave shape 7 is moved relative to the convex shape 8 and 9 by mounting the concave shape 7 on a support that pivots in front of a fixed plate having the convex shapes 8 and 9 disposed thereon. This displacement may equally well be obtained by mounting the concave shape 7 on a support that slides relative to a fixed plate having the convex shape 8 and 9 disposed thereon. Other methods of displacement can be envisaged, and in particular methods that can be deduced from those described by inverting the moving parts.

In a preferred embodiment of the invention, the method comprised the sequential steps of:
    placing a first concave shape (7) which faced a second convex shape (8) so as to define a first mold cavity for the first layer, with the first and second shapes arranged such that the first layer has a thickness that decrease, along a vertical direction, going from a top edge towards a bottom edge, and a constant thickness along a horizontal direction,
    injecting a colored thermoplastic material between the first and second shapes to form the first layer, the first and second shapes being heated to a temperature over the glass transition temperature of the colored thermoplastic material being injected;
    spacing the first and second shapes apart from each other, with the thus-formed first layer remaining in position in the concave first shape, said first shape being maintained to the temperature used during the first injecting step;
    facing the concave first shape towards a convex third shape (9) so that a concave face (10) of the first layer co-operates with the convex third shape (9) to define a cavity for forming the second layer;
    injecting a non-colored thermoplastic material into a cavity formed between the concave face of the first layer and the convex third shape, said third shape being heated to a temperature over the glass transition temperature of the non-colored thermoplastic material being injected, to form the second layer with a thickness that varies in a manner complementary to the thickness of the first layer so that the combined thickness of the first and second layer remains constant along any horizontal directions.

The temperature of the shapes is very important in the method of the present invention to allow the formation of a lens according to the thickness profile and to assure a good fusion without stress constraints between the first layer and the second layer.

A non-colored thermoplastic material for forming the layer 2 is then injected while in soft form into the cavity formed between the concave face 10 of the layer 1 and the convex shape 9. The convex shape 9 is arranged in such a manner that the layer 2 is of thickness which varies in this case in a manner that corresponds to that of the layer 1.

The thermoplastic materials used for the layers 1 and 2 may, for example, be of the polycarbonate, polyamide, acrylic, polymethyl methacrylate, etc. . . . type.

The layer 1 may also be made using a material that presents photochromic properties.

After the thermoplastic material forming the layer 2 has set, the lens is unmolded and the layer 2 is optionally shaped in order to obtain a correcting lens.

Naturally, the invention is not limited to the implementation described and various implementations can be provided without going beyond the ambit of the invention as defined by the claims.

In particular, the method of the invention is applicable to any type of lens, and in particular to: non-correcting sunglass lenses, correcting sunglass lenses, sunscreens, correcting lenses having a single focus, correcting lenses having progressive focus, . . . .

In addition, the layer 2 may be colored using a tint that is different from that of the layer 1 so as to obtain a two-color lens.

In this case the thickness of the tinted layer as measured in any horizontal section of the lens is constant so that the intensity of the tint presented by the lens is likewise constant in any horizontal plane. In this case, the non-tinted layer is of a thickness measured in a horizontal section of the lens that is likewise constant. In a variant, the non-tinted layer may be thicker in the vicinity of its edge that is to be beside the nose of the spectacle wearer and thinner in the vicinity of its edge that is to be beside one of the temples of the spectacles. This makes it possible to obtain a lateral offset of the optical center of the lens (off-centering) which is particularly useful for lenses of strong curvature. Under such circumstances, the invention makes it possible to conserve constant tint for the lens, the thickness of the tinted layer itself being maintained constant over the width of the lens.

What is claimed is:

1. A method of manufacturing a lens presenting a graded tint lens comprising first and second layers each of which is made of a thermoplastic material, with only one of the layers being colored in the tint concerned, the method comprising the steps of:
    injecting the thermoplastic material of the first layer into a first mold cavity in order to form the first layer, wherein:
    the first layer is the layer colored in the tint concerned and occupies a front face of the lens,
    said first layer being of varying thickness along a vertical direction and presenting on a top edge a thickness which is greater or equal to about 1.5 mm and on a bottom edge a thickness which is at least less than or equal to about 0.8 mm;

said variation of the thickness of the first layer from the top to the bottom of the lens providing a graded vertical tinting effect to the lens, which presents a major variation of transmission (Tv), along a vertical direction, into a space comprised from about 20 to 25 mm above and below a geometric centre of said lens along a horizontal direction, said first layer being of constant thickness as measured along a horizontal direction to provide along this horizontal direction a constant horizontal tinting effect to the lens;

and placing the first layer in a second mold cavity and injecting therein the thermoplastic of the second layer so as to form the second layer on the first layer, the second layer occupying a rear face of the lens, said second layer being of varying thickness along a vertical direction from a top edge of the lens to a bottom edge of the lens, in a substantially complementary manner with the first layer to provide a lens which presents on the top edge and on the bottom edge a thickness at least greater than 1.5 mm said second layer being of varying thickness as measured along a horizontal direction to provide an optical property to the lens.

2. The method of manufacture according to claim 1, wherein the second layer is not tinted.

3. The method of manufacture according to claim 1, wherein the second layer is colored in a tint different from the tint of the first layer.

4. The method of claim 1, wherein, the first and second layers are molded using an injection molding installation and comprising the sequential steps of:

placing a first concave shape which faced a second convex shape so as to define a first mold cavity for the first layer, with the first and second shapes arranged such that the first layer has a thickness that decrease, along a vertical direction, going from a top edge towards a bottom edge, and a constant thickness along a horizontal direction, injecting a colored thermoplastic material between the first and second shapes to form the first layer, the first and second shapes being heated to a temperature over the glass transition temperature of the colored thermoplastic material being injected;

spacing the first and second shapes apart from each other, with the thus-formed first layer remaining in position in the concave first shape, said first shape being maintained to the temperature used during the first injecting step;

facing the concave first shape towards a convex third shape so that a concave face of the first layer co-operates with the convex third shape to define a cavity for forming the second layer;

injecting a non-colored thermoplastic material into a cavity formed between the concave face of the first layer and the convex third shape, said third shape being heated to a temperature over the glass transition temperature of the non-colored thermoplastic material being injected, to form the second layer with a thickness that varies in a manner complementary to the thickness of the first layer so that the combined thickness of the first and second layer remains constant along a vertical direction.

5. The method of claim 1, wherein said first layer of varying thickness along the vertical direction presents on the top edge a thickness of about 1.5 mm to 2 mm.

6. The method of claim 1, wherein said first layer of varying thickness along the vertical direction presents on the bottom edge a thickness which is about 0.5 mm to 0.8 mm.

7. The method of claim 1, wherein said thermoplastic material is selected from the group consisting of polycarbonate, polyamide, acrylic and polymethyl methacrylate.

* * * * *